Oct. 16, 1951          A. R. HUTT          2,571,248

UNIVERSAL TORCH MACHINE

Filed March 30, 1948          4 Sheets-Sheet 1

INVENTOR
ARTHUR R. HUTT
BY
ATTORNEYS

Oct. 16, 1951     A. R. HUTT     2,571,248
UNIVERSAL TORCH MACHINE

Filed March 30, 1948     4 Sheets-Sheet 2

INVENTOR
ARTHUR R. HUTT
BY
ATTORNEYS

Oct. 16, 1951  A. R. HUTT  2,571,248

UNIVERSAL TORCH MACHINE

Filed March 30, 1948  4 Sheets-Sheet 3

INVENTOR
ARTHUR R. HUTT
BY
ATTORNEYS

Oct. 16, 1951     A. R. HUTT     2,571,248
UNIVERSAL TORCH MACHINE

Filed March 30, 1948     4 Sheets-Sheet 4

INVENTOR
ARTHUR R. HUTT
BY
ATTORNEYS

UNITED STATES PATENT OFFICE 2,571,248

UNIVERSAL TORCH MACHINE

Arthur R. Hutt, Chatham, N. J., assignor to Air Reduction Company, Incorporated, a corporation of New York Application March 30, 1948, Serial No. 17,970

5 Claims. (Cl. 266—23)

This invention relates to universal gas cutting and welding machines of the kind in which a cutting or welding torch and a tracer are both mounted for unitary and universal movement in a plane so that a pattern which the tracer is caused to follow is reproduced by the torch.

There are several types of universal torch machines of this kind now in use, the most common of which are the folding parallelogram type and the double rectilinear motion type. The folding parallelogram type works on the pantograph principle and usually has a front bar to which the tracer and the torch are clamped and which is connected to a rear stationary frame, or to a rear movable carriage, by a pair of arms at each side of the machine that are pivotally joined end-to-end, the forward end of one arm being pivotally connected to the front bar and the rear end of the other arm being pivotally connected to the rear frame or carriage. The double rectilinear motion type of machine has a base carriage which is guided rectilinearly, usually by a track on which the carriage runs, and a second carriage mounted on the base carriage and guided thereon for rectilinear movement at right angles to the path of movement of the base carriage, the tracer and the torch being mounted on this carriage. The tracer used in both types of machine usually has a motor-driven traction wheel that is steered either manually or automatically to follow the pattern, or it may have a motor-driven magnetic spindle which follows a template.

One advantage of the folding parallelogram type of universal torch machine is that it is quite accurate since the folding parallelogram frame offers little resistance to movement by the tracer and therefore the tracer can be made to follow the line of the pattern without much difficulty. However, the work area of this type of machine is limited in size by the range of universal movement permitted the tracer and torch by the pivoted arms of the folding parallelogram frame, unless the frame is mounted on a movable carriage, in which case the size of the work area is enlarged longitudinally of the path of travel of the carriage but not transversely thereof. The principal advantage of the double rectilinear motion type of machine is that it can be constructed so that not only the base carriage but also the transversely movable carriage on which the tracer and torch are mounted are capable of quite an extensive rectilinear movement, thereby making it possible for the machine to have a very large work area. However, when the machine is made large enough for heavy work and for cutting through-out a large area, the base carriage is likely to have considerable inertia and to require too much power from the tracer to move it.

The principal object of this invention is to provide a universal torch machine which operates on the principle of the double rectilinear motion type of machine and therefore has the large work area advantage of this type of machine and yet, even though made large enough to have this advantage, has the accuracy of the folding parallelogram type of machine.

According to the invention the machine, in its preferred form, comprises a base carriage guided to move rectilinearly, and a second carriage mounted on the base carriage and guided to move rectilinearly transversely of the path of travel of the base carriage and carrying the tracer and the torch. This second carriage will hereinafter be referred to as the transversely movable carriage. The transversely movable carriage is not guided directly on the base carriage but on a transversely extending guide member so mounted on the base carriage as to have limited movement relative to the base carriage laterally of itself and longitudinally of the path of travel of the base carriage. The base carriage is self-propelled from a variable speed reversible power source, and the supply of driving power to it as well as the direction in which it is power driven and the speed at which it is driven are controlled by the lateral movement of the above-mentioned guide member relative to the base carriage. Therefore when the tracer moves longitudinally of the path of travel of the base carriage, or has a component of movement so oriented, the base carriage is almost immediately power-driven either forward or rearward depending upon the direction of movement of the tracer, and at a speed which corresponds substantially to the speed at which the tracer is moving in a true forward or rearward direction, thereby relieving the tracer of the necessity of moving the base carriage. The inertia of the transversely movable carriage to which the tracer and torch are clamped is relatively small and therefore the movement of this carriage by the tracer presents no difficulty. The power source from which the base carriage is driven preferably comprises a continuously running electric motor coupled to a variable speed transmission having an output speed range from a predetermined maximum speed in one direction through zero speed to the same maximum speed in reverse direction. The above-mentioned movable member on which the transversely movable carriage is guided is operatively connected to and adjusts the variable speed transmission in such a way that when the tracer has no movement or component of movement in a direction in which the base carriage is movable the transmission has zero output speed and therefore transmits no driving power to the base carriage, but when the tracer has movement or a component of movement in a direction in which the base carriage is movable, then the transmission is automatically adjusted to drive the base carriage at the proper speed in one direction or the other depending upon the direction of movement of the tracer. This type of drive for the base carriage eliminates high inertia loads which would occur if starting and stopping of the motor were necessary to start and stop the base carriage and also eliminates jarring of the torch.

A universal torch machine embodying the invention is illustrated in the accompanying drawings, in which.

Figure 2:
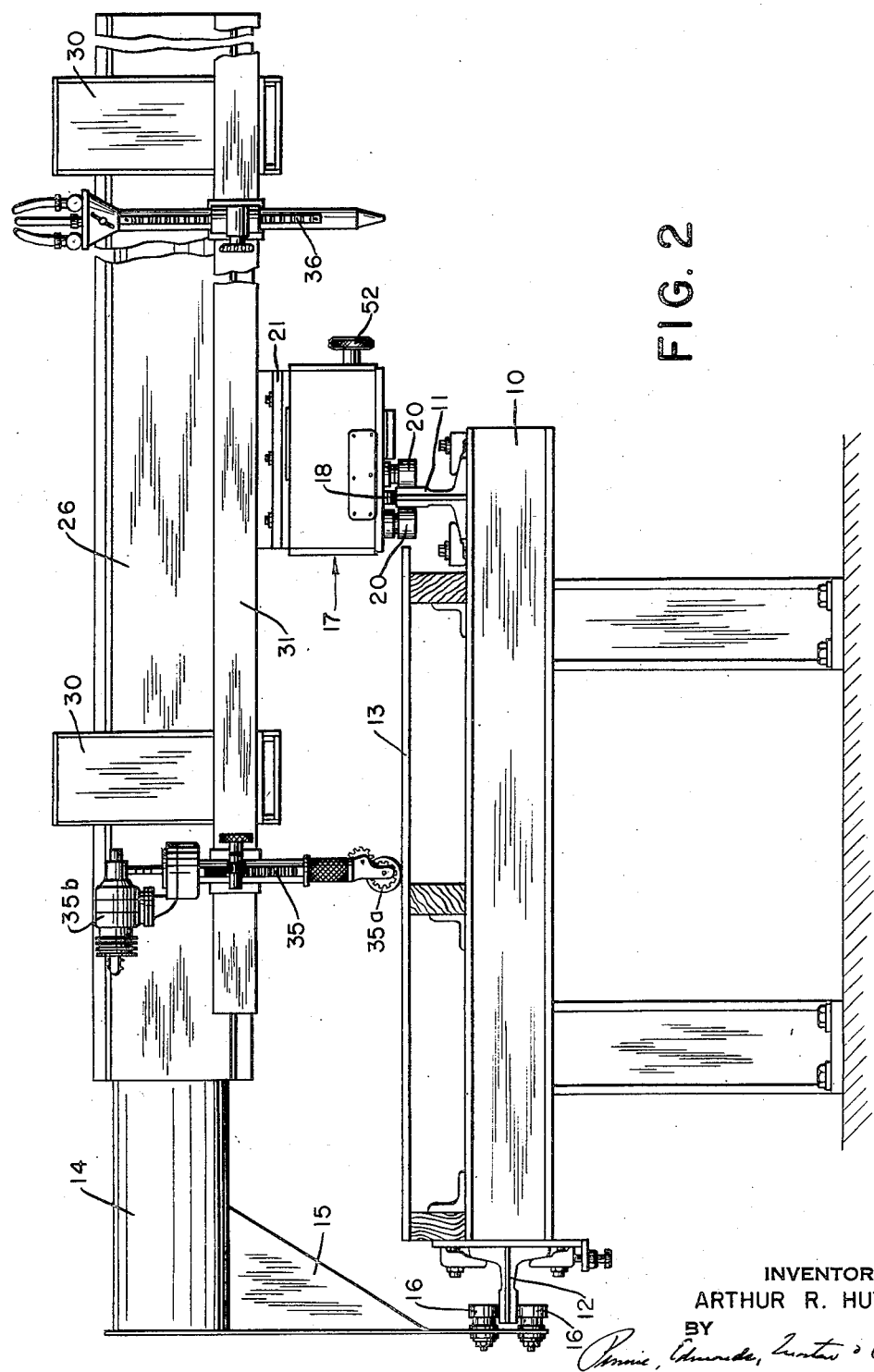
Fig. 2 is a front view of the machine of Fig. 1.

Referring first to Fig. 2, a table 10 carries a rail 11, a rail 12, and a tracing surface 13. The rail 11 is bolted to the table in an upright position and the rail 12 is attached to the edge of the table in a horizontal position. The two rails 11 and 12 provide a track along which the base carriage moves and which guides the base carriage rectilinearly.

Figure 3:
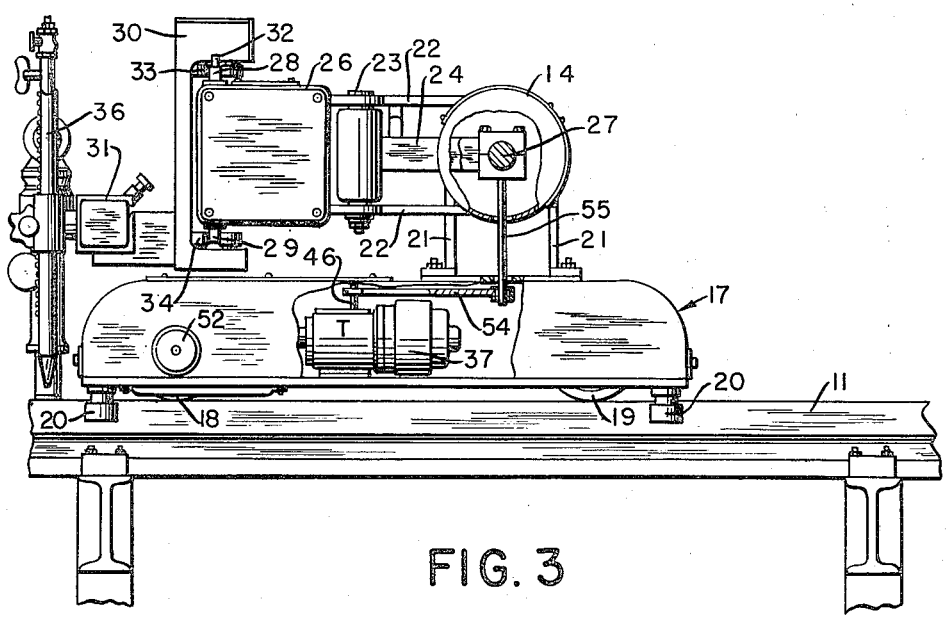
Fig. 3 is an end view of the machine of Fig. 1 partly broken away.

The base carriage itself includes a tubular member 14 having a bracket 15 attached to one of its ends. A set of rollers 16 carried by the bracket 15 engage the sides of the horizontal rail 12 to help support and steady the carriage as it moves along the track. Most of the weight of the machine is supported by a traction unit 17 which has a power-driven traction wheel 18, and an idler wheel 19 which appears in Fig. 3 but not in Fig. 2. The wheels 18 and 19 ride on the top of rail 11. Guide rollers 20 engage the sides of the rail 11 and do most of the guiding of the base carriage along the track. The traction unit 17 will be more fully described hereafter. It is attached to the tubular member 14 by brackets 21 (see also Fig. 3).

Figure 1:
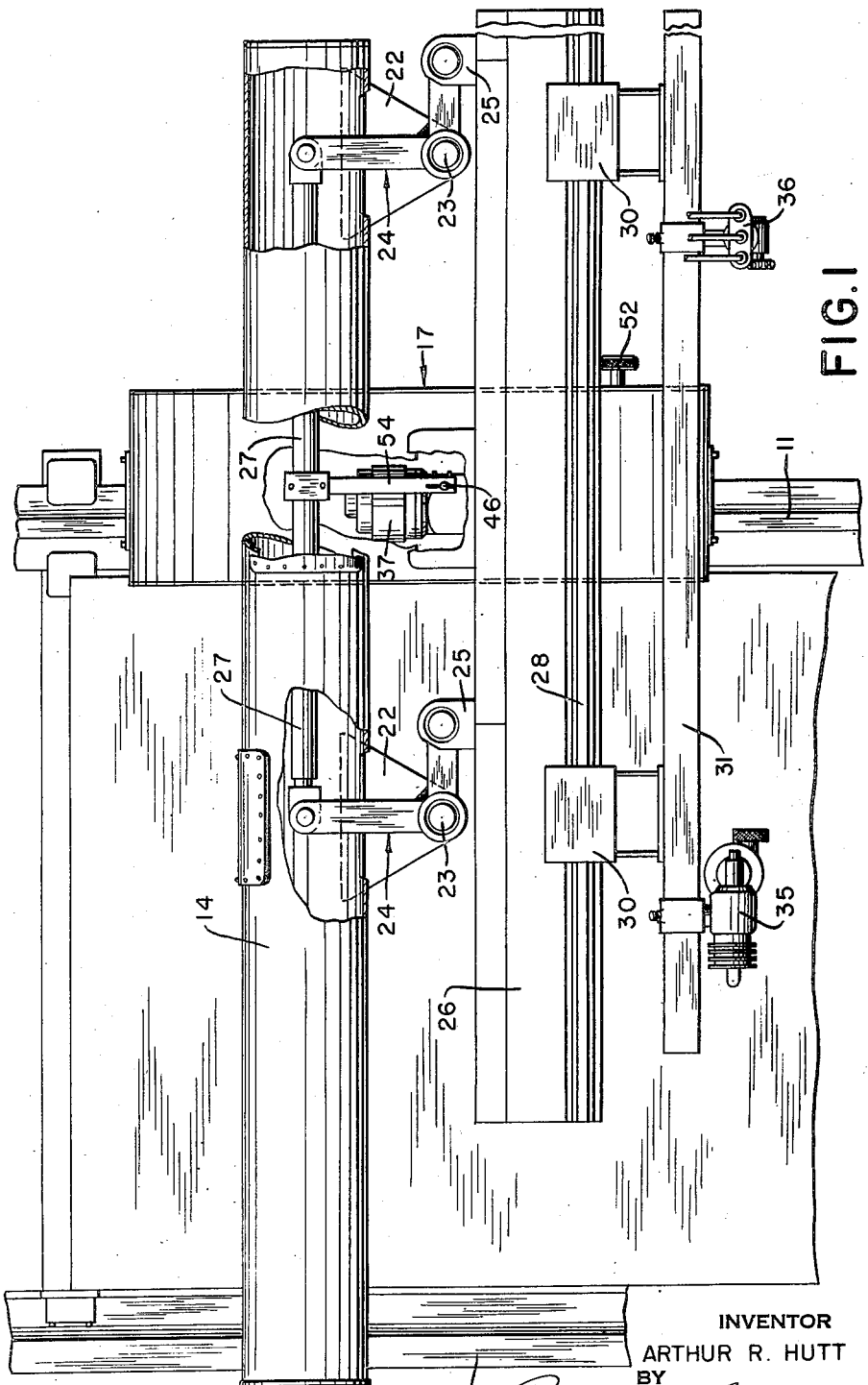
Figure 1 is a plan view of the machine partly broken away.

Referring to Fig. 1, brackets 22, rigidly attached to tubular member 14, support pivots 23 in fixed position with respect ot the base carriage. A bell crank lever 24 is mounted on each of the pivots 23. One arm of each bell crank lever is pivotally attached to one of a pair of brackets 25 which are rigidly secured to a transversely extending guide bar 26. The other arm of each bell crank lever projects into the interior of the tubular member 14 by passing through a suitable opening in the wall of the tubular member. The arms of the two bell crank levers that thus project into the interior of the tubular member 14 are pivotally interconnected by a link 27 within the tubular member. Rotation of the bell crank levers 24 about their pivots 23 therefore produces limited longitudinal movement of the link 27 within the tubular member 14.

Rails 28 and 29 secured, respectively, to the top and bottom of the guide bar 26 guide and support a pair of trucks 30. Only the top rail 28 on the bar 26 appears in Fig. 1, but both rail 28 and rail 29 appear in Fig. 3. A torch bar 31 is secured to the trucks 30. The trucks 30 roll along the rails 28 and 29 on rollers 32, 33 and 34. A tracer 35 and any desired number of torches are clamped to the torch bar 31. One of the torches is shown at 36. The trucks 30 and the torch bar 31 constitute a unitary carriage which is movable rectilinearly along the rails 28 and 29 carried by the bar 26. This carriage is the transversely movable carriage hereinbefore referred to. It will now be seen that the base carriage is capable of rectilinear movement longitudinally of the track rails 11 and 12 and the carriage made up of the trucks 30 and torch bar 31 is capable of rectilinear movement transversely of the path of travel of the base carriage. The base carriage therefore provides for the longitudinal component of the universal movement allowed by the machine and the carriage 30—31 provides for the lateral or transverse component.

The tracer 35 may be a conventional type of tracer having a traction wheel 35a driven by an electric motor 35b (Fig. 2). The traction wheel may be manually steered or automatically steered to follow a pattern electrically or magnetically, as is well understood in the art. Since the torch bar 31 to which both tracer and torch are attached can move in any direction in a plane but can move only parallel to itself, the torch must follow a path that duplicates the path followed by the tracer.

The tracer has sufficient power to move the transversely movable carriage since only the torch bar 31 and the trucks 30 need be moved. However, when the machine is designed for heavy work and for cutting throughout a large area the tracer can not be depended upon to move the base carriage along its track, and for this reason the base carriage is power-driven independently of the tracer but its power propulsion is controlled in response to movement of the tracer in the manner hereinafter described.

Figure 4:
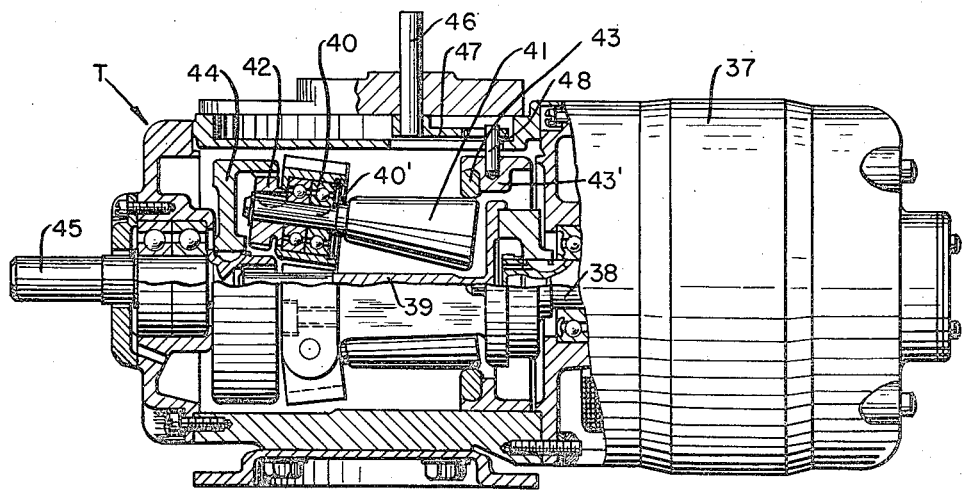
Fig. 4 is a longitudinal section through the variable speed transmission employed to drive the base carriage.

The drive for the traction unit 17 is by an electric motor 37 (Figs. 1, 3 and 4) through a variable speed transmission shown in section in Fig. 4 and denoted in general by the reference character T. The variable speed transmission may be of a known commercial type having an output speed that ranges from full speed forward through zero speed to full speed in the reverse direction. While in the particular variable speed transmission shown in the drawing the output speed varies gradually and therefore covers the whole range of speeds in both directions, a type of variable speed transmission could be used if desired in which the output speed varies in small steps. A brief description of the variable speed transmission will suffice since its details do not form part of the invention.

Referring to Fig. 4, the housing of the drive motor 37 is bolted to the housing of the variable speed transmission T. The shaft 38 of the electric motor rotates at constant speed. It is coupled to a shaft 39 in the variable speed transmission and therefore this shaft also rotates at constant speed. A number of bearing assemblies 40 are carried by and rotate with the shaft 39. Each of these bearings rotatably supports a shaft 40' on one end of which there is a tapered roller 41 and on the other end of which there is a gear 42. A traction ring 43, fixed in an annular member 43' which is slidable longitudinally of the tapered rollers 41, is maintained in frictional engagement with the tapered rollers. The gears 42 mesh with an internal gear 44 which is secured to an output shaft 45. Thus rotation of the shaft 39 produces planetary revolution of the tapered rollers 41 and the gears 42 about the axis of this shaft. The frictional engagement between the traction ring 43 and the tapered rollers causes each of the tapered rollers to rotate about its own axis as the tapered rollers revolve in planetary fashion about the axis of the shaft 39 and therefore each gear 42 also rotates about its own axis. The planetary revolution of the gears 42 about the axis of the shaft 39, and the rotation of these gears about their own axes are in opposite directions. This produces a net rotation of the internal gear 42 which is proportional to the difference between the rotary speed of the gears 42 about their own axes and the speed of their planetary revolution about the axis of shaft 39. By moving the traction ring 43 along the length of the tapered rollers 41 the speed at which the tapered rollers rotate about their own axes when they revolve in planetary fashion about the axis of shaft 39 can be varied, thereby varying the speed and direction of rotation of output shaft 45. By properly proportioning the gears and the tapered rollers the variable speed transmission will have an output speed which is adjustable from a predetermined maximum speed in one direction through zero speed to the same maximum speed in a reverse direction. The member 43' carrying the traction ring 43 is shifted longitudinally of the rollers 41 to vary the output speed of the transmission by angular rotative movement of a shaft 46 which extends through the top wall of the transmission housing. The inner end of this shaft is attached to a crank arm 47 which has slotted connection with a pin 48 secured to the member 43'. As hereinafter described the shaft 46 is rotated to adjust the output speed of the transmission by the longitudinal movement of the link 27 (Fig. 1) previously described.

Figure 5:
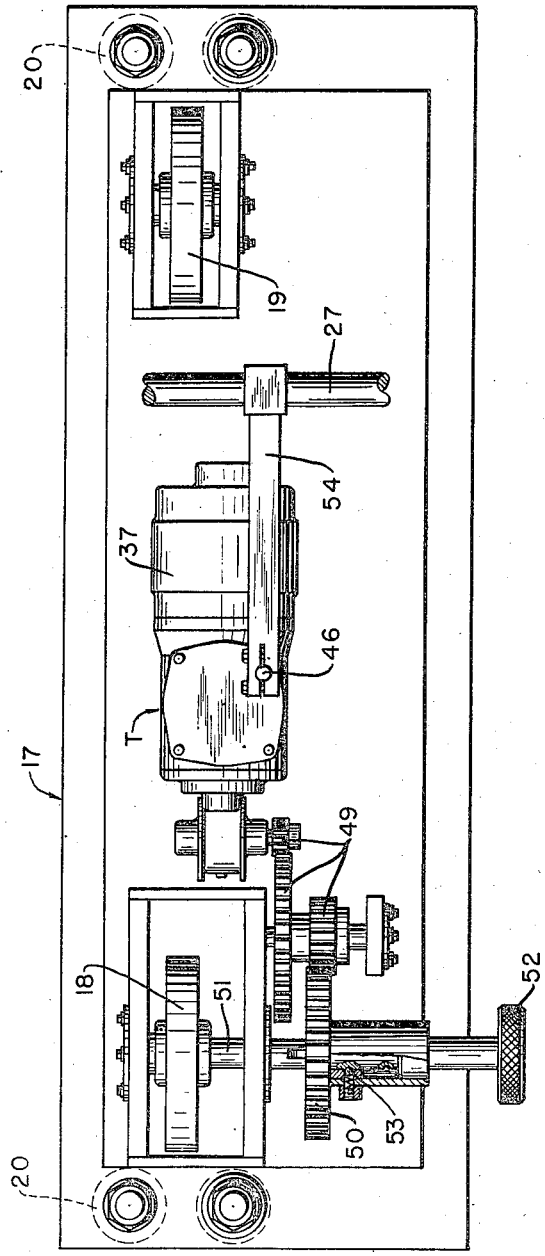
Fig. 5 is a plan view of a portion of the base carriage showing the driving machanism.

The output shaft 45 of the variable speed transmission is coupled through reduction gears 49 and 50 (Fig. 5) to a shaft 51 on which the traction wheel 18 of the traction unit is mounted. The gear 50 is keyed to the shaft 51 and can be moved along this shaft by means of a knob 52 to which the gear is attached. By pulling the knob 52 outwardly the gear 50 can be disconnected from its driving gear and the base carriage is then freewheeling and can be pushed along its track for quick positioning. A spring-pressed detent 53 yieldingly retains the gear 50 in its engaged or disengaged position.

A horizontal crank arm 54 (Figs. 1, 3 and 5) is clamped at one end to the upper end of the shaft 46 and is pivotally connected at its other end to a vertical rod 55 (Fig. 3) which is clamped at its upper end to the link 27. The shaft 46 is aligned with the pivots 23 of the bell crank levers 24, and the crank arm 54 has the same length as the arms of the bell crank levers which extend into the tubular member 14. Therefore rotation of the bell crank levers about their pivots 23 produces an equal amount of rotation of the shaft 46 which determines the speed and direction of travel of the base carriage.

In Fig. 1 the bell crank levers 24 are shown in the position they assume when the tracer is not trying to move the base carriage in either direction. However, it should be noted that the position of the traction ring 43 of the variable speed transmission (Fig. 4) does not correspond to this position of the bell crank levers because it is shown in one of its extreme positions in which the transmission would have maximum output speed in one direction. Actually the traction ring 43 would be at the midpoint of its adjustment when the bell crank levers 24 are in the position shown in Fig. 1 so that the transmission would have zero output speed. When the tracer moves transversely of the machine, or has a transverse component of movement, it moves the transversely movable carriage (made up of the trucks 30 and the bar 31) rectilinearly on the bar 26. The power of the tracer is ample to accomplish this as the trucks 30, and the bar 31 along with the parts that it carries, have but little inertia and are movable rather freely along the bar 26. When the tracer moves longitudinally of the machine, or has a longitudinal component of movement, the bar 26 is moved laterally of itself relative to the base carriage and this causes rotation of bell crank levers 24 about their pivots, thus shifting the link 27 lengthwise and adjusting the variable speed transmission to cause the base carriage to start moving. If the movement of the tracer that results in turning the bell crank levers is forward the bell crank levers will rotate about their pivots in a clockwise direction moving link 27 to the right in Fig. 1. Rearward movement of the tracer rotates the bell crank levers in a counterclockwise direction moving link 27 to the left. Thus the shaft 46 which adjusts the variable speed transmission will be turned in one direction or the other depending upon whether the movement of the tracer is forward or rearward. The variable speed transmission will start moving the base carriage almost as soon as the tracer starts to move longitudinally of the machine or starts having a longitudinal component of movement. The tracer will of course adjust the position of the bell crank levers 24 until the variable speed transmission drives the base carriage at a speed which corresponds to the speed of movement of the tracer in the true forward or rearward direction. Thus the base carriage follows the tracer whenever the tracer moves directly forward or directly rearward or has a forward or rearward component of motion.

While the machine may be constructed exactly as illustrated, it may be made much wider than shown, thereby giving it a much larger work area. It has been shortened up in its transverse dimension to permit making the drawings to a large scale for the sake of clarity.

It will now be evident that the machine combines the large working area advantage of the double rectilinear motion type of universal torch machine with the accuracy of the folding parallelogram type since both the base carriage and the transversely movable carriage can have extensive rectilinear movement, and a minimum of power is required of the tracer to effect rectilinear movement of either of the carriages.

I claim:
1. A universal torch machine of the double rectilinear motion type comprising a movable base carriage guided to move along a path rectilinearly and provided with reversible power driving means, a guide bar, means including a pair of arms pivotally connecting the guide bar at spaced points to parts of the base carriage and restraining the guide bar against substantial lengthwise movement while allowing it only a small amount of back-and-forth movement relative to the base carriage laterally of itself and longitudinally of the line of travel of the base carriage, a tracer and torch mounted for unitary movement along said guide bar and guided thereon to move rectilinearly at right angles to the line of travel of the base carriage, and means operatively connected to said arms for actuation thereby and operated as a result of movement of said guide bar by the tracer relative to the base carriage for rendering the driving means of the base carriage effective to move the base carriage along its line of travel in the direction in which said guide bar is moved relative to the base carriage.

2. A universal torch machine of the double rectilinear motion type comprising a movable base carriage guided to move along a path rectilinearly and provided with reversible power driving means, a guide bar, a pair of bell crank levers pivotally connected to parts of the base carriage, said guide bar being pivotally connected at two points spaced along its length to two of the corresponding arms of the bell crank levers, a link pivotally connecting the other two arms of the bell crank levers, the guide bar being restrained by the bell crank levers and said link to remain at right angles to the line of travel of the base carriage and being restrained against substantial lengthwise movement and being allowed only a small amount of back-and-forth movement relative to the base carriage laterally of itself and longitudinally of the line of travel of the base carriage, such back-and-forth movement of the guide bar serving to move said link lengthwise through said bell crank levers, a tracer and torch mounted for unitary movement along said guide bar and guided thereon to move rectilinearly at right angles to the line of travel of the base carriage, and means actuated by said link when the guide bar is moved by the tracer relative to the base carriage for rendering the driving means of the base carriage effective to move the base carriage along its line of travel in the direction in which said guide bar is moved relative to the base carriage.

3. A universal torch machine of the double rectilinear motion type comprising a movable base carriage guided to move along a path rectilinearly and provided with reversible power driving means, said power driving means including an electric motor that rotates continuously and in one direction during operation of the machine and also including a variable speed transmission driven by the motor and having an output speed which is gradually variable from full speed forward through zero speed to full speed in reverse, a guide, means mounting said guide on the base carriage and restraining the guide to remain at right angles to the line of travel of the base carriage and also restraining it against substantial movement transversely of the line of travel of the base carriage while allowing it only a small amount of back-and-forth movement relative to the base carriage laterally of itself and longitudinally of the line of travel of the base carriage, a tracer and torch mounted for unitary movement along said guide and guided thereon to move rectilinearly at right angles to the line of travel of the base carriage, and means operated as a result of movement of said guide by the tracer relative to the base carriage for adjusting said variable speed transmission so that it has zero output speed when the guide is in a predetermined normal position relative to the base carriage and so that it will start moving the base carriage along its path of travel in the direction in which the guide is moved relative to the base carriage and at a speed which depends upon the extent of the movement of the guide relative to the base carriage.

4. A universal torch machine in accordance with claim 1 in which the power driving means for the base carriage includes an electric motor that rotates continuously and in one direction during operation of the machine and also includes a variable speed transmission driven by the motor and having an output speed which is gradually variable from full speed forward through zero speed to full speed in reverse, and in which the means operatively connected to said arms adjusts said variable speed transmission so that it has zero output speed when the guide bar is in a predetermined normal position relative to the base carriage and so that it will start moving the base carriage along its path of travel in the direction in which the guide bar is moved relative to the base carriage and at a speed which depends upon the extent of movement of the guide bar relative to the base carriage.

5. A universal torch machine in accordance with claim 2 in which the power driving means for the base carriage includes an electric motor that rotates continuously and in one direction during operation of the machine and also includes a variable speed transmission driven by the motor and having an output speed which is gradually variable from full speed forward through zero speed to full speed in reverse, and in which the means connected to said link adjusts said variable speed transmission so that it has zero output speed when the guide bar is in a predetermined normal position relative to the base carriage and so that it will start moving the base carriage along its path of travel in the direction in which the guide bar is moved relative to the base carriage and at a speed which depends upon the extent of movement of the guide bar relative to the base carriage.

ARTHUR R. HUTT.

REFERENCES CITED

The following references are of record in the file of this patent:

UNITED STATES PATENTS

| Number | Name | Date |
| --- | --- | --- |
| 1,553,769 | Godfrey | Sept. 15, 1925 |
| 1,933,300 | Anderson | Oct. 31, 1933 |
| 2,032,733 | Anderson | Mar. 3, 1936 |
| 2,038,820 | Anderson | Apr. 28, 1936 |
| 2,196,292 | Coughlin | Apr. 9, 1940 |
| 2,429,686 | Helmkamp | Oct. 28, 1947 |
| 2,448,598 | Jones | Sept. 7, 1948 |

FOREIGN PATENTS

| Number | Country | Date |
| --- | --- | --- |
| 253,714 | Great Britain | June 24, 1926 |